(12) United States Patent
Beier et al.

(10) Patent No.: US 10,599,928 B2
(45) Date of Patent: Mar. 24, 2020

(54) METHOD AND SYSTEM FOR ENABLING INFORMATION IN AUGMENTED REALITY APPLICATIONS

(71) Applicant: INTERNATIONAL BUSINESS MACHINES CORPORATION, Armonk, NY (US)

(72) Inventors: Felix Beier, Haigerloch (DE); Armin Roth, Tuebingen (DE); Benno Stäbler, Holzgerlingen (DE); Sebastian Muszytowski, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/985,766

(22) Filed: May 22, 2018

(65) Prior Publication Data

US 2019/0362148 A1   Nov. 28, 2019

(51) Int. Cl.
| | | |
|---|---|---|
| G06F 15/16 | (2006.01) | |
| G06K 9/00 | (2006.01) | |
| G06T 19/00 | (2011.01) | |
| G06F 16/583 | (2019.01) | |

(52) U.S. Cl.
CPC ....... *G06K 9/00671* (2013.01); *G06F 16/583* (2019.01); *G06K 9/00288* (2013.01); *G06T 19/006* (2013.01)

(58) Field of Classification Search
CPC .................................................. G06K 9/00671
USPC ......................................................... 345/633
See application file for complete search history.

(56) References Cited

U.S. PATENT DOCUMENTS

| 7,403,643 B2 | 7/2008 | Ianculescu et al. | |
|---|---|---|---|
| 2012/0026191 A1 | 2/2012 | Aronsson et al. | |
| 2012/0092528 A1 | 4/2012 | Jung et al. | |
| 2013/0044130 A1 | 2/2013 | Geisner et al. | |
| 2014/0108530 A1* | 4/2014 | Papakipos | G06Q 30/08 709/204 |
| 2014/0294257 A1 | 10/2014 | Tussy | |
| 2015/0279117 A1* | 10/2015 | Schimke | G06F 16/00 345/633 |
| 2018/0165849 A1* | 6/2018 | Johansen | G06T 11/60 |

OTHER PUBLICATIONS

Gorman, "Googlerola Buys Viewdle, ups Android's Augmented Reality and Face Recognition Game", Engadget, http://www.engadget.com/2012/10/03/googlerola-buys-viewdle-ups-androids-augmented-reality-and-fac/, Oct. 3, 2012, pp. 1-2.

* cited by examiner

*Primary Examiner* — Javid A Amini
(74) *Attorney, Agent, or Firm* — Tihon Poltavets

(57) ABSTRACT

A method includes identifies first user-specific rules defining information associated with a first user to make available to one or more other users. The method identifies second user-specific rules defining information of interest associated with a second user. The method detects the first user is in a vicinity of the second user. The method determines based on the first user-specific rules and the second user-specific rules, a set of information associated with the first user to share with the second user. The method displays to the second user in an augmented reality application, the determined set of information associated with the first user.

16 Claims, 3 Drawing Sheets

METHOD AND SYSTEM FOR ENABLING INFORMATION IN AUGMENTED REALITY APPLICATIONS

The present invention relates to the field of digital computer systems, and more specifically, to augmented reality applications.

BACKGROUND

Meeting people in real life can be a struggle since relevant information about someone might not be present in the moment of meeting. Relevant information such as the person's name, affiliation, and significant characteristics are often missing. Augmented reality (AR) and wearables such as glasses or augmented reality apps for mobile devices are used to augment the real view with other information. However, the augmenting information needs to be controlled in order to achieve the desired effect of the AR applications.

SUMMARY

Embodiments in accordance with the present invention disclose a method, computer program product and computer system for enabling information sharing in augmented reality applications. First user-specific rules defining information associated with a first user to make available to one or more other users are identified. Second user-specific rules defining information of interest associated with a second user are identified. The first user is detected as being in a vicinity of the second user. A set of information associated with the first user to share with the second user is determined based on the first user-specific rules and the second user-specific rules. The determined set of information associated with the first user is displayed to the second user in an augmented reality application.

BRIEF DESCRIPTION OF THE SEVERAL VIEWS OF THE DRAWINGS

The present invention together with the above-mentioned and other objects may best be understood from the following detailed description of the embodiments, but not restricted to the embodiments.

DETAILED DESCRIPTION

Figure 1:
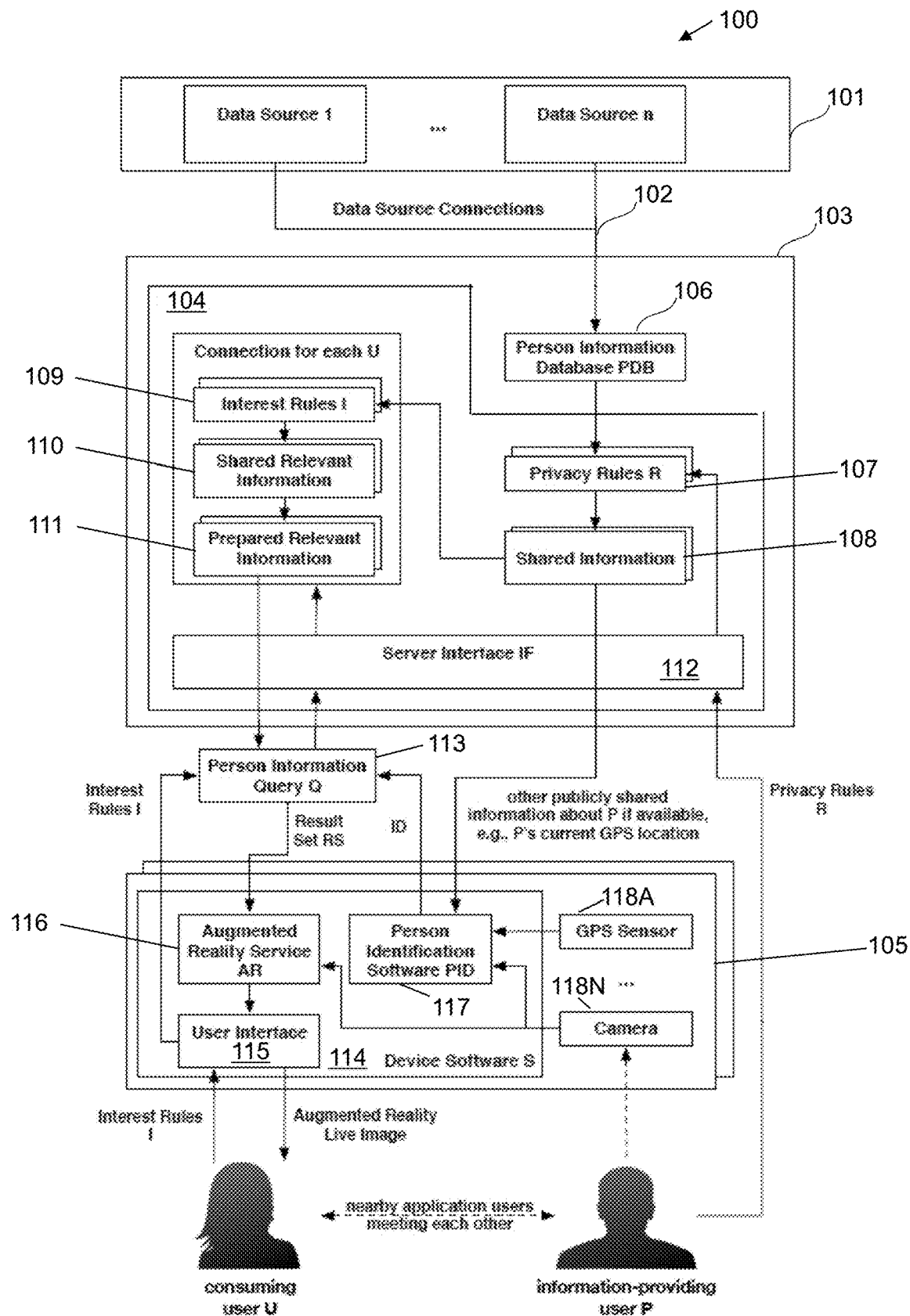
FIG. 1 is a block diagram of an augmented reality system, in accordance with an embodiment of the present invention.

The descriptions of the various embodiments of the present invention are presented for purposes of illustration and are not intended to be exhaustive or limited to the embodiments disclosed. Many modifications and variations are apparent to those of ordinary skill in the art without departing from the scope and spirit of the described embodiments. The terminology used herein is chosen to best explain the principles of the embodiments, the practical application or technical improvement over technologies found in the marketplace, or to enable others of ordinary skill in the art to understand the embodiments disclosed herein.

The information utilized for augmenting the content of AR application depends on the context in which it is used. For example, technological conferences need a special subset of the data, whereas other situations, such as a party or dating application require different kinds of information. As sources for the person-related data may be manifold (e.g., social networks or corporate directories) and the desired information needs to be retrieved from various sources, it may be challenging to evaluate and consume the data specifically in the moment when a person is met. Therefore, relevant information has to be quickly extracted, filtered, and prepared for display on the (augmented reality) screen. From the opposite point of view, i.e., from individuals whose information is exposed to others, a method is needed where they can configure which information is publicly shared or visible in which occasion. The present method enables the selection and ranking of useful data tailored to specific events or situations, while ensuring privacy by controlling access to personal data available to others.

The present method allows to fetch information about a (potentially unknown) person P (e.g. from a central repository) and present it to another person (user?) U on his/her augmented reality device. The present method provides means to implement privacy constraints by specifying rules which encode the information that person P wants to share publicly about him/her. Furthermore, user U is provided the option to specify a set of rules that encode which information is currently relevant for U when meeting P in particular contexts, e.g., on a conference.

The present method may enable a controlled and centralized access to information for AR applications. The present method may enhance the value of displayed information for the user of the AR application tailored to specific contexts where the AR application is used.

An AR device comprises a device capable of displaying a real-time view of a physical, real-world environment while altering elements within the displayed view of the environment. The AR device may include and/or be communicatively coupled to detection means such as one or more camera devices used to capture a view of the real-world environment and may further include computer software and/or hardware configured to augment elements of the captured scene. The AR device may comprise an AR application that is configured for performing the augmented display. For example, the AR application may be configured to control a detection means, such as a video camera, in order to collect and render image data of a physical scene (whether acquired in real-time or previously acquired) in combination with the determined information. The rendered image data may be image data of a camera or video live streaming. The video live streaming may provide live or real-time video content using a camera of the AR device through a display of the AR device or through another display e.g. by broadcasting the real-time video content through the Internet. The launching of the AR application may for example trigger the video live streaming. For example, the determined information may be overlaid with the real-time video content.

According to one embodiment, the determining of the information of the first user to share with the second user comprises: generating an identifier of the detected first user; querying a server for information about the detected first user using the generated identifier, thereby causing the server to identify the information of the first user to share with the second user based on the first and second rules; and receiving the information of the first user to share with the second user. The identifier is a unique identifier of the first user. The first and second rules may for example be stored on the server and/or on an AR device comprising the AR application. The server may enable a centralized control of AR applications and may thus save processing resources at the AR devices that would otherwise be required to determine the information to be made available.

According to one embodiment, making the determined information of the first user available comprises: overlaying the determined information with a video content (e.g. live video content) generated (and being displayed) by the augmented reality application. This embodiment may enable to display only relevant information while ensuring user privacy as defined by first and second rules.

According to one embodiment, the detecting of the first user is performed while the video content is being displayed. This may enable a real-time access to information on imaged users. The detection of the first user is performed by at least one of a camera and a position sensor, wherein the identifier is generated by processing information of at least one of the camera and the position sensor. This may enable obtaining accurate information on the imaged users and may avoid the display of wrong information that may be caused by a non-unique identifier. According to one embodiment, the processing of the information received from the camera is performed using a facial recognition algorithm. This may further increase the accuracy of the obtained information and ensure the ID is also generated in an accurate manner According to one embodiment, providing user-specific first rules comprising providing a first user interface and receiving from the first user via the first user interface the user-specific first rules. According to one embodiment, providing user-specific second rules comprising providing a second user interface and receiving from the second user via the second user interface the user-specific second rules. According to one embodiment, the first user interface is the second user interface. For example, the first user interface may be part of the server and/or AR device. According to one embodiment, the method further comprises: building or providing a database of information on users using one or more data sources. The data sources may for example comprise social networks, corporate directories, or other sources of information related to users.

The database may be part of the server. In this case, the data gathering and preparation step can be executed asynchronously which minimizes latencies when processing queries against it. Also, the resulting architecture is more reliable in case a connected data source is temporarily not available.

In another example, the database may be provided as a virtual database which provides access to information about people by dispatching queries to subqueries of connected data sources (the virtual database refers to content in external sources such as Internet, intranet, cloud-based sources, local stores, etc.). In this case there is no need to replicate at the server information that is available in other sources and thus no update anomalies or processing efforts are needed. In addition, no single point of interest is provided for possible attackers that try to steal person-relevant data.

According to one embodiment, the second rules further indicate the order in which the interesting information is to be provided. For example, the second rules may specify how available data should be ranked (e.g., by relevance) to reduce the amount of available information that needs to be displayed and reduce display size on small-sized displays often found in wearables or mobile devices. For example, the information may be overlaid based on its order e.g., the information with the highest relevance (e.g. first ranked attribute) may be displayed if the size of the display is not large enough to display or overlay all of the information. This may further optimize and control the provided information in AR applications.

According to one embodiment, the method further comprises receiving a modification of the first and/or second rules, wherein the determining of information of the first user to share with the second user is performed using the modified rules. Both the first and second users can modify the rules and the system asserts that only matching results which satisfy both conditions are displayed to the second user (consuming user). This may further increase the accuracy of the displayed data by using up-to-date rules.

According to one embodiment, the making available of the determined information comprises overlaying the determined information with data being displayed by the AR application.

According to one embodiment, the method further comprises receiving further second rules at an AR device running the AR application, wherein the making available of the determined information comprises filtering the determined information using the further second rules resulting in filtered data and overlaying the filtered data with data being displayed by the AR application.

According to one embodiment, the method further comprises providing an AR device comprising the AR application, wherein the AR device comprises further information on the first user, wherein the making available of the determined information comprises combining the determined information and the further information and making available the combined information in the AR application. This may enrich the displayed content by the AR application.

According to one embodiment, the method further comprises before making available the combined information in the AR application, selecting from the combined information data that satisfy the second rules, and making available the selected data in the AR application.

FIG. 1 illustrates is a block diagram of an augmented reality system 100 (AR system) in accordance with an example of the present disclosure.

The AR system 100 comprises a one or more data sources 101 providing information about people or users. The data sources 101 may for example comprise social networks, corporate directories, or other sources of information related to users such as users U and P. In one example, the AR devices 105 may be used as further data sources of information of users. For example, user U may denote the user role of a user that consumes the information about the others while user P may denote the role of users that provide information about themselves.

The AR system 100 further comprises a central server 103. The central server 103 may be connected to each of the data sources 101 via one or more networks 102 for example, the Internet, a local area network, a wide area network and/or a wireless network. The central server 103 is configured to build a person identification database (PDB) 106. The building of PDB 106 may be performed by gathering and consolidating information about people from data sources 101. The received information from data sources 101 may for example be further preprocessed e.g., by indexing it. The PDB 106 may or may not be part of the central server 103 e.g. the central server 103 may be configured to connect to the PDB 106 if it is not part of the central server 103.

The PDB 106 may for example comprise a graph database storing information in RDF format. The PDB 106 may be the own database of central server 106. In this case, the data gathering and preparation step can be executed asynchronously which minimizes latencies when processing queries against it and the resulting architecture is more reliable in case a connected data source 101 is temporarily unavailable.

In another example, the PDB 106 may be provided as a virtual database which enables access to information about people by dispatching queries to subqueries of connected data sources 101. In this case there is no need to replicate information that is available in other sources e.g. 101 and thus no update anomalies, no processing efforts needed for this. In addition, no single point of interest is provided for possible attackers that try to steal person-relevant data.

In a further example, a hybrid solution combining the two examples of PDB 106 may be used. This may for example enable that only hot data sets might be cached in the central server 106 to increase reliability for this information and reduce latencies when they are queried. The non-hot data (e.g., data having a creation date that is older than a predefined time period, e.g., 3 years) is kept in the sources 101 and requested on demand when it is needed.

The central server 103 further comprises a server interface 112. The server interface 112 may for example be used for receiving privacy rules 107 and interest rules 109, hereinafter referred to collectively as "the rules 107" and "the rules 109". The rules 107 and 109 and the server interface 112 may be part of an AR management component 104 of the central server 103. In another example, the rules 107 and/or 109 may be provided via the AR device 105 if the users have access to the AR device 105.

The rules 107 may for example be rules defined and provided by the user P. The user P may specify privacy rules R about data that shall be shared with other users, e.g., specifying which information values should be visible by which data source. The rules 107 may indicate which information to make available about users such as user P and U in various contexts. For example, the information of user P stored in PDB may be provided in the form of a table having attributes (e.g. age, preferences, address, titles, scientific production, etc.). The rules 107 may for example indicate for each of the attributes in which context (e.g. the context may be defined by context information such as an event ID, so that a conference context may have a respective event ID etc.) and/or with which users the values of the respective attributes can be provided. For example, a rule 107 may indicate that the address of user P would not be provided in the context of a technological conference while it can be provided in the context of a party. The rule 107 may for example further indicate which users should not receive such information.

The rules 109 may indicate which information is interesting to the users such as users P and U in various contexts. The user may specify rules 109 about data that shall be displayed about other users, e.g., which information values shall be displayed based on some context information such as event identifiers. For example user U may specify that the he or she wanted to have information related to the skills of a person, e.g. the rule 109 may indicate that user U wants only to have attribute values for scientific production and title of other users. The rules 109 may further indicate the relevance the data to be provided for user U, e.g. user U may require that the values of attribute age have the highest relevance followed by address attribute values, etc., so that if the display device does not have enough space to display all data, the data may be displayed following its relevance. For example, display age values first and if there is still enough space display address values, etc.

For example, user U may want to see relevant information about another (potentially unknown) user P where user P decided upfront which information shall be shared about him/her based on rules 107 and 109.

The central server 103 may be connected to one or more AR devices 105 via one or more networks for example, the Internet, a local area network, a wide area network and/or a wireless network. Each of the rules 107 and 109 may be received via the server interface 112 and/or via AR devices 105.

The AR device 105 comprises an AR application 114. The AR device 105 may be configured to run the AR application 114. The central server 103 may have a connection to each AR device 105 via AR application 114. For example, the AR device 105 may enable analytic services by running the AR application 114. The AR application 114 comprises a user interface 115, a person identification (PID) software component 117, and an AR service 116. The user interface 115 may for example be configured to receive data such as rules 109 from users such as user U. Upon receiving rules 107 and/or 109 by the AR device 105, the AR device 105 may connect to central server 103 e.g. by implementing a predefined data communication protocol specified, e.g., in the AR management component 104. And the received rules, e.g., 107 and/or 109 may be propagated to the central server 103.

The AR device 105 further comprises user detection or monitoring means (collectively referred to by 118) such as a GPS sensor 118A and camera 118N. The PID component 117 may be configured to receive information (e.g., camera image data, geospatial location data, etc.). That information may be received by the PID component 117 on a periodic basis or by streaming e.g. while user U is using AR application 114. Upon receiving the information, the PID component 117 may analyze the received information to determine if a user is indicated in the received information. This may enable the PID component 117 to detect and identify a specific person such as user P whose data (e.g. image or position) were collected by the detection means 118. For example, the PID component 117 may determine the unique ID upon detecting the presence of the user P in the vicinity of the user U. The detection of the vicinity of the two users can be performed by an image processing application or by the PID component 117 that, for example, detects the movement of objects or users in the collected images.

The PID component 117 may for example be configured to generate and provide a unique person identifier ID using received information about user P from the detection means 118 while user U is using AR application 114 and meets user P (users U and P are in the vicinity of each other). The PID component 117 may further use publically shared information 108 (e.g. as provided by the central server 103 or data sources 101) to determine the person identifier.

The unique person identifier may for example be determined using face recognition algorithms, spatial filters on GPS locations returning people nearby, etc. and the unique ID may be provided with a respective specific probability determined based on the technique used to generate the ID. The AR service 116 may be configured to display information about detected users e.g. user P by for example overlaying information on the detected user P with a camera live stream by camera 118N. The overlaid information may be obtained from the central server 103 using the unique ID.

Although the PID component 117 and detection means 118 are shown as part of AR device 105, the PID component 117 and detection means 118 may be part of the central server 103 and/or the AR device 105. The person identification may thus be implemented by the AR device 105 or the central server 103 or by combination of both.

For example, if data from data sources 101 needs to be considered which is not available on the AR device 105, a server implementation may be used to determine the person identifier. If the AR device 105 has all necessary information to identify users e.g. using contact information and possibly receiving location information about the users, the detection mechanism can be implemented on the AR device. A mixture of both may be used, e.g., to increase detection accuracy, as a hybrid approach.

Assuming for example that user U is the owner of AR device 105 and that the user U has access to the AR application 114. The AR application 114 may for example be running e.g. a live video streaming is being performed. While using the AR application 114, the user P moves near or at the vicinity of the user U so that the detection means 118 can collect information about the user P. For example, the AR application 114 is being used by user U when meeting user P. The PID component 117 is receiving information (e.g. image data and position data) from the detection means 118 while the AR application 114 (e.g. live video streaming) is being used by the user U. The PID component 117 may detect, using received information, the presence of user P when he or she is in the vicinity of the user U. The PID component 117 may generate the unique ID for user P using the received information. This may be performed by for example using face recognition algorithms, spatial filters on GPS locations returning people nearby, etc. The unique ID may be provided with a respective specific probability determined based on the technique used to generate the ID. For example, the probability may indicate the probability of the imaged object to belong to a face of the user or not. For example, the probability may indicate that the unique ID for user P is provided with, e.g., 80% probability. The central server 103 may respond to the query if the probability is higher than a given threshold, e.g., 30%.

The PID component 117 may generate a person information query 113 in order to query the central server 103 for information about the detected user P. The query 113 may indicate the unique ID of the user P. The query 113 may further indicate currently active interest rules 109 if new rules 109 of user U have been received and not yet propagated to central server 103. The query 113 may further indicate context information such as an event ID. For example, the context information may be received from user U via user interface 115. The AR application 114 may be configured, upon being launched, to prompt the user U to indicate the context information of the context in which the user U is (currently) involved in. In another example, the AR application 114 may be configured to determine the context information based on the position of the user U e.g. if the user U is in the school, the context information may be determined accordingly.

Upon receiving the query 113, the central server 103 may be configured to filter data of user P from the PDB 106 based on rules 107 and the information provided in the query 113. This filtering may result in shared information 108. For example, the shared information 108 may comprise only information allowed by user P to be accessed by user U in the context indicated by the context information of the query 113.

The central server 103 may further determine which interesting data of the shared information 108 that is relevant (e.g. currently relevant) for user U based on the rules 109. This may result in selecting shared relevant information 110 from the shared information 108. For example, if the shared information 108 comprises values of the attributes address, age, and title, and the rules 109 indicate that only the age values are relevant for user U, only attributes values of the attribute age would be selected from the shared information 108.

The shared relevant information 110 may further be processed by the central server 103. The processing may for example comprise ranking by relevance the data for user U as defined in the rules 109, e.g., the user U may indicate in rules 109 that the attribute values of attribute age has the highest relevance followed by address attribute values, etc. The processing may further comprise preparing a result set for display on the AR device 105 and/or optimizing the layout or structure of the information on that device and sending the result set back to the AR device 105 for display to user U via the AR service 116.

Upon receiving query result set from the central server 103, the AR service 116 may display the received set on top or overlay information of the result set with the camera live stream.

The AR system 100 may further provide an information display optimization algorithm, which may be part of the central server 103 and/or the AR device 105 for further optimizing the content of the result set. The information display optimization algorithm may be configured to optimize the display of the result set based on device-specific information of the AR device 105 such as screen resolutions. The optimization may further comprise the filtering of the result set, e.g., based on the device information about how much data can be displayed at all, effectively reducing the data volume.

The information display optimization algorithm may be used at the central server 103 in order to generate the result set. This may enable the central server 103 to for example use connection information about the devices 105 to optimize the display information centrally. A centralized computation of the result sets may save energy on the device 105 endpoint, effectively extending their battery lifetime.

Using the information display optimization algorithm at the AR device 105 may have the advantage that the central server 103 does not need to know which types of devices 105 are connected. Optionally, an additional post processing step may be applied to the data that shall be displayed via the AR device 105. For example, user U may have collected additional data about user P, e.g., personal address books, local email database, etc. on AR device 105 which is not provided by data sources 101. This additional information might be merged with the result set as received from the central server 103 (or as further processed by the information display optimization algorithm) to provide additional information forming an enhanced result set. In this case, rules 109 may optionally be applied again on the enhanced result set e.g. to rank information by relevance.

Figure 2:
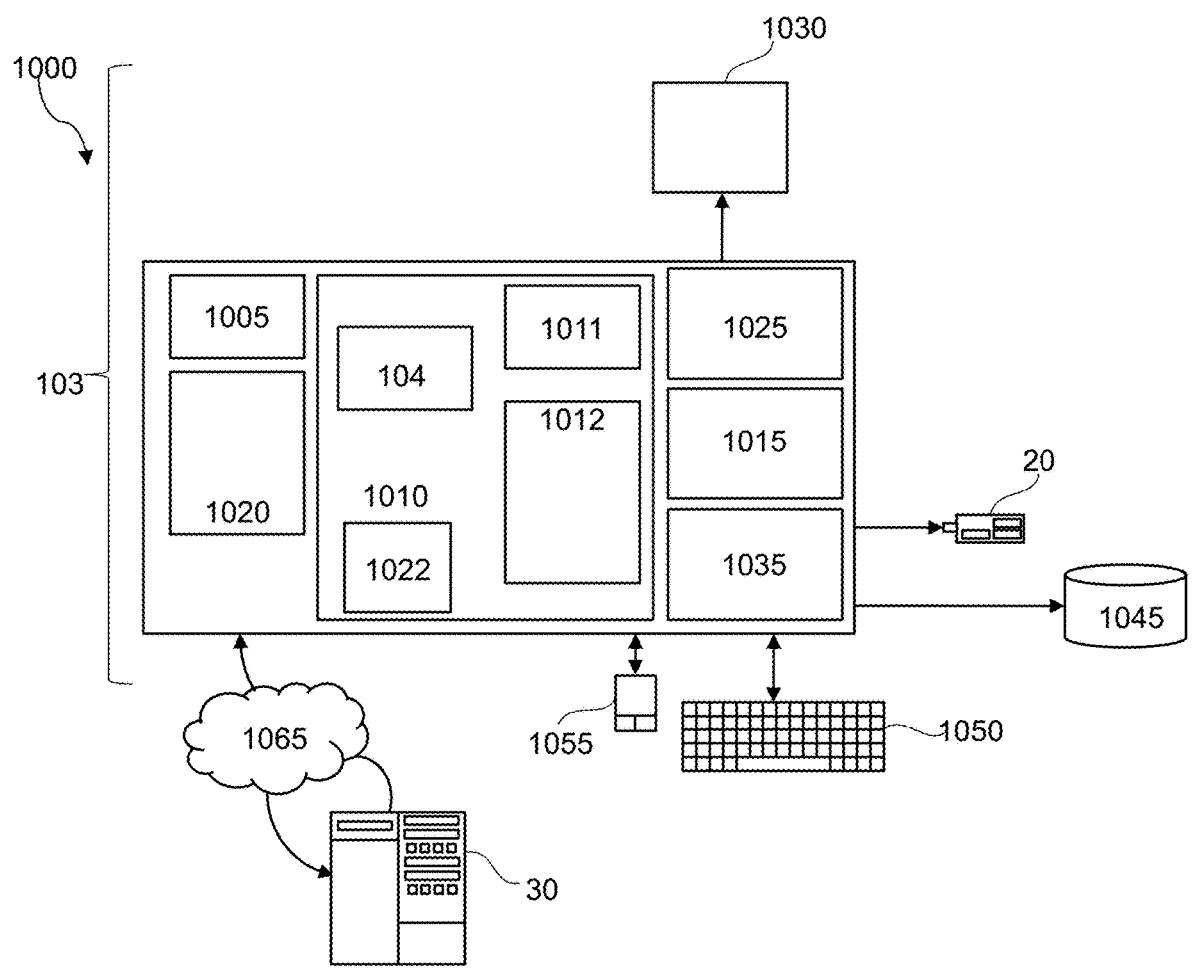
FIG. 2 is a computerized system, suited for implementing one or more method steps, in accordance with an embodiment of the present invention.

FIG. 2 represents central server 103 as a general computerized system, suited for implementing method steps as involved in the disclosure. The general computerized system may represent the structure of the AR device as well.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 1012, 1022 (including firmware 1022), hardware (processor) 1005, or a combination thereof. In exemplary embodiments, the methods described herein are implemented in software, as an executable program, and is executed by a special or general-purpose digital computer, such as a personal computer, workstation, minicomputer, or mainframe computer. The most general system 1000 therefore includes a general-purpose computer 103.

In exemplary embodiments, in terms of hardware architecture, as shown in FIG. 2, the computer 103 includes a processor 1005, memory (main memory) 1010 coupled to a memory controller 1015, and one or more input and/or output (I/O) devices (or peripherals) 20, 1045 that are communicatively coupled via a local input/output controller 1035. The input/output controller 1035 can be, but is not limited to, one or more buses or other wired or wireless connections, as is known in the art. The input/output controller 1035 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 20, 1045 may generally include any generalized cryptographic card or smart card known in the art.

The processor 1005 is a hardware device for executing software, particularly that stored in memory 1010. The processor 1005 can be any custom made or commercially available processor, a central processing unit (CPU), an auxiliary processor among several processors associated with the computer 103, a semiconductor-based microprocessor (in the form of a microchip or chip set), a macroprocessor, or generally any device for executing software instructions.

The memory 1010 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM). Note that the memory 1010 can have a distributed architecture, where various components are situated remote from one another, but can be accessed by the processor 1005.

The software in memory 1010 may include one or more separate programs, each of which comprises an ordered listing of executable instructions for implementing logical functions, notably functions involved in embodiments of this invention. In the example of FIG. 2, software in the memory 1010 includes instructions 1012 e.g. instructions to manage databases such as a database management system. The memory 1010 may further comprise a query optimizer. The query optimizer may comprise instructions e.g. software instructions that when executed may provide a query execution plan for executing a given query.

The software in memory 1010 shall also typically include a suitable operating system (OS) 1011. The OS 1011 essentially controls the execution of other computer programs, such as possibly software 1012 for implementing methods as described herein.

The methods described herein may be in the form of a source program 1012, executable program 1012 (object code), script, or any other entity comprising a set of instructions 1012 to be performed. When a source program, then the program needs to be translated via a compiler, assembler, interpreter, or the like, which may or may not be included within the memory 1010, so as to operate properly in connection with the OS 1011. Furthermore, the methods can be written as an object-oriented programming language, which has classes of data and methods, or a procedure programming language, which has routines, subroutines, and/or functions.

In exemplary embodiments, a conventional keyboard 1050 and mouse 1055 can be coupled to the input/output controller 1035. Other output devices such as the I/O devices 1045 may include input devices, for example but not limited to a printer, a scanner, microphone, and the like. Finally, the I/O devices 20, 1045 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 20, 1045 can be any generalized cryptographic card or smart card known in the art. The system 1000 can further include a display controller 1025 coupled to a display 1030. In exemplary embodiments, the system 1000 can further include a network interface for coupling to a network 1065. The network 1065 can be an IP-based network for communication between the computer 103 and any external server, client and the like via a broadband connection. The network 1065 transmits and receives data between the computer 103 and external systems 30, which can be involved to perform part or all of the steps of the methods discussed herein. In exemplary embodiments, network 1065 can be a managed IP network administered by a service provider. The network 1065 may be implemented in a wireless fashion, e.g., using wireless protocols and technologies, such as WiFi, WiMax, etc. The network 1065 can also be a packet-switched network such as a local area network, wide area network, metropolitan area network, Internet network, or other similar type of network environment. The network 1065 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 103 is a PC, workstation, intelligent device or the like, the software in the memory 1010 may further include a basic input output system (BIOS) 1022. The BIOS is a set of essential software routines that initialize and test hardware at startup, start the OS 1011, and support the transfer of data among the hardware devices. The BIOS is stored in ROM so that the BIOS can be executed when the computer 103 is activated.

When the computer 103 is in operation, the processor 1005 is configured to execute software 1012 stored within the memory 1010, to communicate data to and from the memory 1010, and to generally control operations of the computer 103 pursuant to the software. The methods described herein and the OS 1011, in whole or in part, but typically the latter, are read by the processor 1005, possibly buffered within the processor 1005, and then executed.

When the systems and methods described herein are implemented in software 1012, as is shown in FIG. 2, the methods can be stored on any computer readable medium, such as storage 1020, for use by or in connection with any computer related system or method. The storage 1020 may comprise a disk storage such as HDD storage.

The memory 1010 may further comprise the AR management component 104. The external systems 30 may for example comprise the PDB 106.

Figure 3:
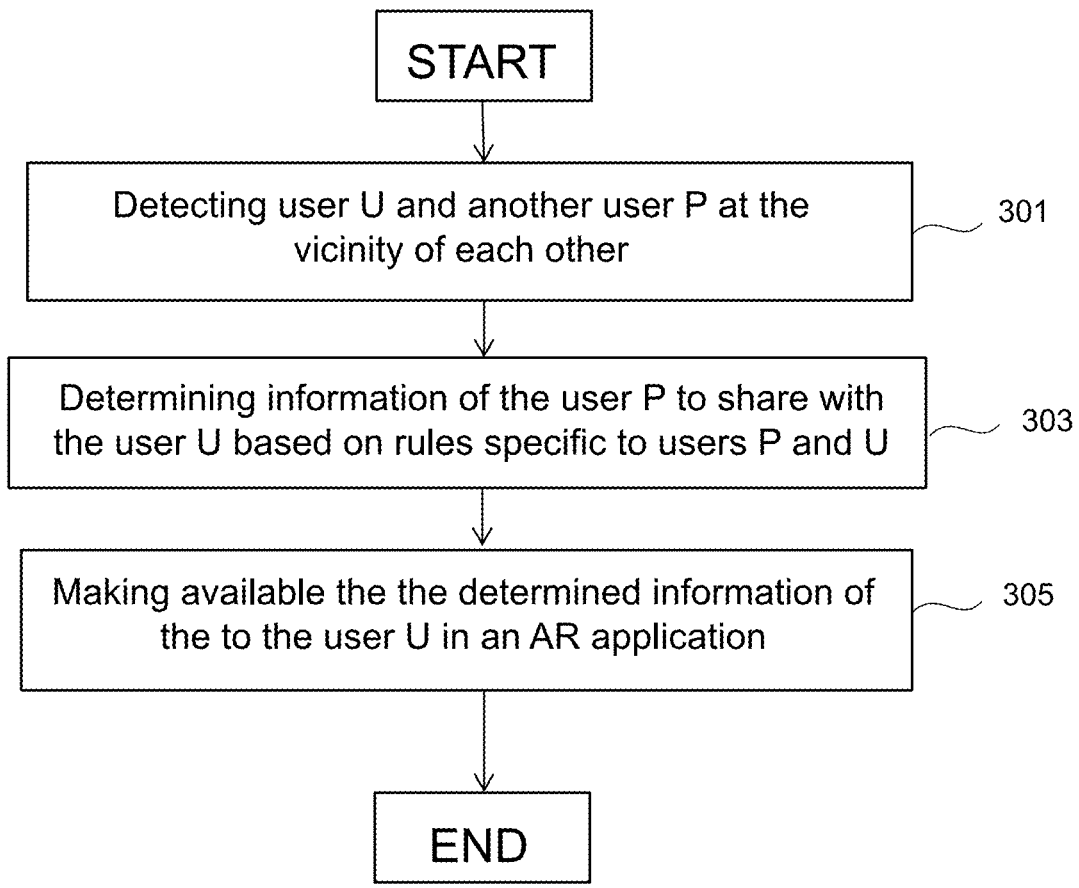
FIG. 3 is a flowchart of a method for an AR application, in accordance with an embodiment of the present invention.

FIG. 3 is a flowchart for an AR application e.g. 114. The AR application 114 may for example being used by user U of FIG. 1 and may trigger a camera or video live stream (real-time streaming).

In step 301, the user U and another user P may be detected at the vicinity of each other. This may, for example, be performed by the PID component 117 or another image analysis component of the AR device analyzing image data by camera 118N and position data by GPS sensor 118A for detecting that the user P is near or in the vicinity of the user U. The GPS sensor may, for example, indicate the position of user U, owner of the AR device 105, and may be used in combination with the position of the object or user P detected in the image data of the camera 118N to determine the distance between user U and user P (detected in the image data). In another example, the AR device 105 may send position information to the central server 103. The position information may, for example, comprise at least one of the GPS position of the user U and the determined distance to the detected user or object. The central server 103 may use the received position information in order to identify a user whose (current) GPS position corresponds to the received position information. And the central server 103 may send at least part of shared information 108 of the identified user that indicates his GPS position. The AR device may then use the received GPS position to determine the distance in a more accurate manner.

For example, the two users U and P are in the vicinity of each other if the distance between the users U and P is smaller than a predefined maximum distance, e.g., 2m. For example, the user U may be the owner of the AR device running the AR application e.g. making a video stream of a given scene and the user P appears in the video at a certain point of time. As the image data representing an object (e.g., the user P) in the acquired video is identified or detected, the position of the object represented in the image data may be determined.

Upon detecting the users U and P as being in the vicinity of each other, a unique identifier may be determined for the user P using at least one of the image data of the camera 118N and GPS data, such that the unique ID can be used by the server 103 to provide information on user P.

In step 303, based on the rules 107 and 109, information 110 of the user P to share with the user U may be determined. For example, information of the user P may be gathered from one or more sources 101. The gathered information may be filtered using the first and second rules resulting in a filtered or selected data. The determined information is the filtered or selected data.

In step 305, the determined information of the user P may be made available to the user U in the AR application 114.

For example, steps 301-305 may be performed by the central server 103. In this case, the PID component 117 (e.g. and the detection means 118) may be part of the central server 103 for performing the detecting step 301. If for example, the detection means 118 are part of the AR device 105, the PID component 117 of the central server 103 may receive from the AR device 105 the information collected by the detection means 118 in order to perform the detection of step 301. The determined information of user P is made available to the user U by sending by the central server 103 the information of user P to the AR device 105 and causing the AR device to display such information e.g. overlay the information with the live stream.

In another example, steps 301-305 may be performed by the AR device 105. In this case, the information 110 of the user P to share with the user U may be determined by querying the central server for such information and causing the central server 103 to determine such information based on the rules 107 and 109 and sending the determined information to the AR device 105. The AR device 105 may display the determined information by overlaying it with the camera live stream.

In another example, a computerized method for augmented reality applications may be provided. The method comprises: storing user-specific first rules defining which information to make available about the user in various contexts, storing user-specific second rules defining which information is interesting to the user in various contexts, detecting a first user and a second user at the vicinity of each other in a specific context (e.g. a conference), having access to user-specific information of the first user that is intended to be shared with other users, determining, based on the user-specific first rules of the first user and user-specific second rules of the second user, which user-specific information of the first user to share within second user, making the determined user-specific information of the first user available to the second user in an augmented reality application.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method comprising:
   identifying, by one or more processors, first user-specific rules defining information associated with a first user to make available to one or more other users, wherein the first user-specific rules represent privacy constraints;
   identifying, by one or more processors, second user-specific rules defining information of interest associated with a second user;
   detecting, by one or more processors, the first user is in a vicinity of the second user based on GPS position data and an analysis of image data captured by a camera on an augmented reality device associated with the second user;
   determining, by one or more processors, context information based on the GPS position data of the second user, wherein the context information includes an event identifier associated with the position of the second user;
   determining, by one or more processors, based on the first user-specific rules and the second user-specific rules, a set of information associated with the first user to share with the second user;
   filtering, by one or more processors, the set of information based on information allowed by the first user to be accessed by the second user in a context indicated by the context information, wherein the filtered set of information represents information associated with the first user relevant to the second user based on the context information; and
   displaying, by one or more processors, to the second user in an augmented reality application in the augmented reality device, the filtered set of information associated with the first user.

2. The method of claim 1, further comprising:
   generating, by one or more processors, an identifier of the detected first user;
   querying, by one or more processors, a server for information about the detected first user using the generated identifier, wherein causing the server to identify the information of the first user to share with the second user based on the first and second rules; and
   receiving, by one or more processors, the information of the first user to share with the second user.

3. The method of claim 1, wherein displaying to the second user in an augmented reality application in the augmented reality device, the filtered set of information associated with the first user comprises:
overlaying, by one or more processors, the filtered set of information with the first user with a video stream generated by the augmented reality application.

4. The method of claim 3, wherein detecting the first user is in the vicinity of the second user while the video stream is generated by the augmented reality application.

5. The method of claim 1, further comprising:
responsive to identifying a first user interface, receiving, by one or more processors, from the first user via the first user interface the first user-specific rules.

6. The method of claim 5, further comprising:
responsive to identifying a second user interface, receiving, by one or more processors, from the second user via the second user interface the second user-specific rules.

7. The method of claim 6, wherein the first user interface is the second user interface.

8. The method of claim 1, further comprising:
receiving, by one or more processors, a modification to the first user-specific rules, wherein the modification indicates the set of information associated with the first user to share with the second user.

9. The method of claim 1, further comprising:
receiving, by one or more processors, the second user-specific rules at the augmented reality device running the augmented reality application; and
determining, by one or more processors, to display the determined set of information associated with the first user in as an overlay in the augmented reality application on the augmented reality device.

10. A computer program product comprising:
one or more computer readable storage media and program instructions stored on at least one of the one or more storage media, the program instructions comprising:
program instructions to identify first user-specific rules defining information associated with a first user to make available to one or more other users, wherein the first user-specific rules represent privacy constraints;
program instructions to identify second user-specific rules defining information of interest associated with a second user;
program instructions to detect the first user is in a vicinity of the second user based on GPS position data and an analysis of image data captured by a camera on an augmented reality device associated with the second user;
program instructions to determine context information based on the GPS position data of the second user, wherein the context information includes an event identifier associated with the position of the second user;
program instructions to determine based on the first user-specific rules and the second user-specific rules, a set of information associated with the first user to share with the second user;
program instructions to filter the set of information based on information allowed by the first user to be accessed by the second user in a context indicated by the context information, wherein the filtered set of information represents information associated with the first user relevant to the second user based on the context information; and
program instructions to display to the second user in an augmented reality application in the augmented reality device, the filtered set of information associated with the first user.

11. The computer program product of claim 10, further comprising program instructions, stored on the one or more computer readable storage media, which when executed by a processor, cause the processor to:
generate an identifier of the detected first user;
query a server for information about the detected first user using the generated identifier, wherein causing the server to identify the information of the first user to share with the second user based on the first and second rules; and
receive the information of the first user to share with the second user.

12. The computer program product of claim 10, wherein program instructions to display to the second user in an augmented reality application in the augmented reality device, the filtered set of information associated with the first user comprises, program instructions, stored on the one or more computer readable storage media, which when executed by a processor, cause the processor to:
overlay the filtered set of information with the first user with a video stream generated by the augmented reality application.

13. The computer program product of claim 12, wherein program instructions to detect the first user is in the vicinity of the second user while the video stream is generated by the augmented reality application.

14. The computer program product of claim 10, further comprising program instructions, stored on the one or more computer readable storage media, which when executed by a processor, cause the processor to:
responsive to identifying a first user interface, receive from the first user via the first user interface the first user-specific rules.

15. The computer program product of claim 14, further comprising program instructions, stored on the one or more computer readable storage media, which when executed by a processor, cause the processor to:
responsive to identifying a second user interface, receive from the second user via the second user interface the second user-specific rules.

16. A computer system comprising:
one or more computer processors;
one or more computer readable storage media; and
program instructions stored on the computer readable storage media for execution by at least one of the one or more computer processors, the program instructions comprising:
program instructions to identify first user-specific rules defining information associated with a first user to make available to one or more other users, wherein the first user-specific rules represent privacy constraints;
program instructions to identify second user-specific rules defining information of interest associated with a second user;
program instructions to detect the first user is in a vicinity of the second user based on GPS position data and an analysis of image data captured by a camera on an augmented reality device associated with the second user;
program instructions to determine context information based on the GPS position data of the second user, wherein the context information includes an event identifier associated with the position of the second user;

program instructions to determine based on the first user-specific rules and the second user-specific rules, a set of information associated with the first user to share with the second user;

program instructions to filter the set of information based on information allowed by the first user to be accessed by the second user in a context indicated by the context information, wherein the filtered set of information represents information associated with the first user relevant to the second user based on the context information; and program instructions to display to the second user in an augmented reality application in the augmented reality device, the filtered set of information associated with the first user.

* * * * *